US008445556B2

(12) United States Patent
Speas

(10) Patent No.: US 8,445,556 B2
(45) Date of Patent: May 21, 2013

(54) CELLULAR ELASTOMER COMPOSITIONS

(75) Inventor: Rick Speas, Forest, VA (US)

(73) Assignee: Rubberlite, Inc., Huntington, WV (US)

( * ) Notice: Subject to any disclaimer, the term of this patent is extended or adjusted under 35 U.S.C. 154(b) by 203 days.

(21) Appl. No.: 12/244,290

(22) Filed: Oct. 2, 2008

(65) Prior Publication Data

US 2009/0082477 A1    Mar. 26, 2009

Related U.S. Application Data

(63) Continuation-in-part of application No. PCT/US2007/025607, filed on Dec. 14, 2007.

(60) Provisional application No. 60/877,880, filed on Dec. 29, 2006.

(51) Int. Cl.
*C08J 9/06* (2006.01)

(52) U.S. Cl.
USPC ........... 521/170; 521/128; 521/130; 521/131; 521/174

(58) Field of Classification Search ................... 521/130, 521/131, 128, 170, 174
See application file for complete search history.

(56) References Cited

U.S. PATENT DOCUMENTS

| | | | |
|---|---|---|---|
| 3,475,522 A * | 10/1969 | Garibian et al. | 264/422 |
| 5,236,964 A | 8/1993 | Savoca et al. | |
| 5,252,617 A | 10/1993 | Werner et al. | |
| 5,792,829 A | 8/1998 | Allen et al. | |
| 5,919,395 A | 7/1999 | Bastin et al. | |
| 6,117,917 A * | 9/2000 | Albouy | 521/116 |
| 6,348,514 B1 | 2/2002 | Calabrese et al. | |
| 6,734,220 B2 | 5/2004 | Niederoest et al. | |
| 6,858,699 B2 | 2/2005 | Michels et al. | |
| 2003/0001302 A1 * | 1/2003 | Murata | 264/46.1 |
| 2003/0100623 A1 | 5/2003 | Kaku et al. | |
| 2006/0235097 A1 | 10/2006 | Mahoney et al. | |

FOREIGN PATENT DOCUMENTS

| | | |
|---|---|---|
| CA | 2 036 125 | 9/1991 |
| CA | 2 107 427 | 4/1994 |
| DE | 31 32 124 A1 | 3/1983 |
| DE | 231 214 A3 | 12/1985 |
| JP | S52-73997 | 6/1977 |
| JP | S58-23406 | 5/1983 |
| JP | S63-16681 | 3/1988 |
| WO | WO 2005/090455 | * 9/2005 |

OTHER PUBLICATIONS

International Search Report and Written Opinion—PCT/US2009/058966.
Annex to the European Search Report—EP Application No. EP 07 86 2922.
Standard Test Method for Rubber Deterioration—Surface Ozone Cracking in a Chamber, ASTM International Designation: D 1149-99.
Standard Test Methods for Vulcanized Rubber and Thermoplastic Elastomers—Tension—ASTM International Designation: D 412-06a.
Standard Test Method for Rubber Property—Resilience by Vertical Rebound, ASTM International Designation: D 2632-01.
Standard Test Methods for Flexible Cellular Materials—Slab, Bonded, and Molded Urethan eFoamsl, ASTM International Designation: D 3574-05.
Standard Specification for Flexible Cellular Materials—Sponge or Expanded Rubber, ASTM International Designation: D 1056-07.

* cited by examiner

*Primary Examiner* — John Cooney
(74) *Attorney, Agent, or Firm* — Womble Carlyle Sandridge & Rice, LLP

(57) ABSTRACT

The present invention provides a process to preparing a polyurethane or polyurethane/urea closed cell foam. This foam, when compared to neoprene foam, exhibits a low water absorption and an additional quality of chlorine content of not greater than 0.5% based on the total weight of the closed cell foam.

16 Claims, No Drawings

CELLULAR ELASTOMER COMPOSITIONS

CROSS-REFERENCE TO RELATED APPLICATIONS

This application is a continuation-in-part of PCT/US07/25607 filed Dec. 14, 2007 which claims priority to U.S. Provisional Application No. 60/877,880 filed on Dec. 29, 2006.

FIELD OF THE INVENTION

The present invention is generally related to polymer compositions and processes of preparing the same. More particularly, the present invention is related to polymer compositions comprising elastomers that exhibit water absorption and flexibility typically associated with polymer compositions that require higher levels of environmentally unfriendly or hazardous components during their preparation.

BACKGROUND OF THE INVENTION

Polymer compositions are often utilized in materials requiring low water absorption with high elasticity. In recent times, neoprene polymer compositions, such as neoprene foams, have been relied upon for use in various applications such as, for example, scuba diving suits, rubber gaskets and washers, tubing, gloves, belting, die cutting, extrusions, sheets, and bearings, where the elastomeric properties are important. Neoprene polymer compositions, however, include chlorine, plasticizers, sulfur, peroxides, or a combination thereof. As a result, neoprene polymer compositions may provide advantageous elastomeric properties, but the process for their production requires environmentally unfriendly, hazardous components. Thus, there exists a need for a polymer composition that exhibits advantageous elastomeric properties as well as a process for preparing a polymer composition that utilizes fewer, if any, environmentally unfriendly, hazardous components.

SUMMARY OF THE INVENTION

The present invention is directed to a polymer composition comprising an elastomer. In one embodiment, the elastomer is a closed cell elastomer. In another embodiment, the elastomer is a urethane. In such an embodiment, the urethane can be a polyurethane. In one embodiment, the polymer composition is a foam. In one embodiment, the polymer composition can be formulated to have physical characteristics similar to those of neoprene polymer compositions without requiring comparable levels of environmentally unfriendly or hazardous components. In one embodiment, the polymer composition is free or substantially free (i.e., less than about 0.5% by weight of the composition) of potentially harmful components such as, for example, neoprene, chlorine, plasticizers, sulfur and peroxide which are typically used in neoprene compounding and manufacturing. In one embodiment, the polymer composition has a water absorption of not greater than 15% according to ASTM D1056.

The present invention also provides a process for preparing the polymer composition. In one embodiment, the polymer composition is prepared by blending a variety of components. In one embodiment, the process comprises blending components including a polyisocyanate as well as a polyester, a polyether polyol, or both a polyester and a polyether polyol.

In another embodiment, the process may utilize at least one an amine catalyst, at least one chemical blowing agent or a combination thereof.

In one embodiment, at least one chemical blowing agent is blended with a polyisocyanate and either a polyether polyol or a polyester or a combination thereof, as well as an amine catalyst. A variety of blowing agents are suitable, including azodicarbonamide and expandable microspheres. In addition to the polymerizable constituents, other components may be included in the composition such as, for example, various catalysts, activators, dispersants, dyes, pigments, fire retardants, anti-microbials, UV and gas fade stabilizers, anti-static additives, chain extenders, cross linkers, or a combination thereof.

In one embodiment, the process for preparing the polymer composition further comprises the step of curing the variety of components to form a polymeric mixture. In one embodiment, the process for preparing the polymer composition further comprises the step of heating the polymeric mixture to form a polymer composition. In one embodiment, the polymeric mixture is heated to a first temperature above the softening temperature of the polymeric mixture. In one embodiment, the first temperature is below the activating temperature of any chemical blowing agent. The process for preparing the polymer composition can further comprise the step of heating the softened polymeric mixture to a second temperature sufficient to activate any blowing agent.

In one embodiment, the polymer composition formed is a foam. In one embodiment, the polymer foam includes closed cells. In one embodiment, the polymer foam includes closed cells, but has less rigidity than conventional closed cell polyurethane foams. The resulting polymer composition, including the foam embodiment, can be used in various applications such as, for example, diving suits, orthotic brace materials, die ejection materials, seals (including those for refrigerator applications), and shock-absorbing bases for road reflectors.

DETAILED DESCRIPTION OF THE INVENTION

The present invention provides a polymer composition that comprises an elastomer. In one embodiment, the polymer composition has a chlorine content of not greater than 0.5%. Thus, the polymer composition comprises a lower level of chlorine in comparison to neoprene polymer compositions but maintains physical characteristics typically associated with such polymer compositions.

In one embodiment, the elastomer is a urethane. In one embodiment, the urethane is a polyurethane. In one embodiment, the elastomer is a closed cell elastomer. The term "closed cell" hereinafter refers to the closed cellular structures within the elastomer. These closed cells are similar to bubbles in the foam which are not broken. In one embodiment, the closed cells are in a compact configuration. The cells can be physically or chemically formed.

In one embodiment, the polymer composition is a foam (e.g., foamed elastomer polymer composition). A foamed elastomer polymer composition can be formed when an elastomer monomer mixture is heated to cause simultaneous polymerization and thermal decomposition of the particles to form a gas. The gas expands in the reacting elastomer monomer mixture to form pores in the final polymer composition.

The present polymer composition has several desirable physical characteristics. In one embodiment, the polymer composition has a high degree of flexibility and strength, while also having the ability to resist water absorption. The ability to resist water absorption is especially desirable in wetsuit applications as well as in various medical and industrial applications. In one embodiment, the polymer composition has a water absorption of not greater than 15% based on the change in mass of the polymer composition before and after immersion in water according to ASTM D1056. Preferably, the composition has a water absorption of not greater than 5% according to ASTM D1056. Most preferably, the composition has a water absorption of not greater than 2% according to ASTM D1056.

ASTM D1056 can be used to determine the water absorption of a polymer composition such as, for example, a closed cell foamed elastomer polymer composition by measuring the change in weight (mass) after a specified immersion period. This test method is indirectly a measure of the sample's cell structure closed cell content. Test specimens approximately 12.5 mm (0.50 in.) in thickness and 2500 mm$^2$ (4 in.$^2$) in area should be used for this test while round specimens are preferable.

Water absorption is measured by submerging a specimen of the polymer composition in distilled water at room temperature (18 to 35° C. (65 to 95° F.)) 50 mm (2 in.) below the surface of the water, and the pressure above the water is reduced to 17 kPa (2.5 psi) absolute for 3 minutes. The vacuum is then released, and the specimen is allowed to remain submerged for 3 minutes at atmospheric pressure. The specimen is then removed, blotted dry, and the percent change in mass is calculated as follows:

$$W=[(A-B)/B]\times 100$$

where:
W=change in mass, %,
A=final mass of specimen, and
B=initial mass of specimen.
The original and final weights of three specimens, the percent change in weight for each specimen as well as the average percent change for the three specimens are reported.

In one embodiment, the polymer composition is high in fluid resistance. High fluid resistance is especially desirable in wetsuit applications as well as in various medical and industrial applications. In one embodiment, the foam has a change in mass of not greater than 75% weight change after a specified immersion time and temperature according to ASTM D1056. Preferably, the foam exhibits a change in mass of not greater than 60% according to ASTM D1056. Most preferably, the foam exhibits a change in mass of not greater than 50% according to ASTM D1056.

Fluid resistance is determined according to ASTM D1056 by means of measuring weight change after a specified immersion time and temperature. Equipment required includes an analytical balance, screens, ASTM Reference Fuel B (See ASTM D 471), paper towels, and 250-cm$^3$ (8-oz) containers (minimum size). The test specimens are 25 mm×50 mm×6 mm (nominally 1 in.×2 in.×0.250 in.) and are preferably cut with clean, square edges.

The specimens are weighed to the nearest 0.01 g and placed on a noncorrosive screen having 2-mm openings (10-mesh) on the bottom of the container. Alternatively, the specimens of one material and screens are placed into cans. One can per material is used. The cans are filled with ASTM Reference Fuel B and sealed with their lids. The cans are stored for 7 days±30 minutes at a temperature of 23±2° C. (73.4±3.6° F.). One specimen at a time is then removed from the test fluid. Without squeezing the specimen, one specimen is placed on top of one sheet of paper towel and a second paper towel is immediately placed on top. The specimen is blotted lightly without squeezing, and then the top paper towel is removed. The mass of the specimen is then immediately determined to the nearest 0.01 g. The percent change in mass is calculated as follows:

$$W=[(A-B)/B]\times 100$$

where:
W=change in mass, %,
A=final mass of specimen, and
B=initial mass of specimen.
The fluid type, time and temperature of test, data from three specimens, and the average of the three specimens are reported.

In one embodiment, the polymer composition has a tensile strength acceptable for various wetsuit, medical and industrial applications while maintaining flexibility. In one embodiment, the polymer composition has a tensile strength of at least 60 psi according to the testing parameters set forth in ASTM D412. In another embodiment, the polymer composition has a tensile strength of at least 80 psi according to ASTM D412. In yet another embodiment, the polymer composition has a tensile strength of at least 100 psi according to ASTM D412.

In another embodiment, the polymer composition has a tensile strength of at least 200 psi according to the testing parameters set forth in ASTM D412. In yet another embodiment, the polymer composition has a tensile strength of at least 250 psi according to ASTM D412. In one embodiment, the polymer composition has a tensile strength of at least 300 psi according to ASTM D412.

In one embodiment, the polymer composition has a high elongation. In one embodiment, the polymer composition has an elongation of greater than 150% according to the testing parameters set forth in ASTM D412. The polymer composition is elastic such that the foam can be stretched repeatedly to 150% or more of the initial length and yet rapidly return to its original shape. Preferably, the polymer composition has an elongation of greater than 250% according to ASTM D412. Most preferably, the polymer composition has an elongation of greater than 350% according to ASTM D412.

Tensile strength and elongation can be determined according to the testing parameters set forth in ASTM D412. Unless otherwise specified, the standard temperature for testing is 23±2° C. Specimens are conditioned for at least 3 hours at this temperature. In the case of a dumbbell or straight specimen, the die should conform to the specified shape and the dimension (e.g., Die A-F; see FIG. 2 of ASTM D412).

Five specimens are prepared for testing. The test specimens are injection molded or cut from a flat sheet not less than 1.3 mm (0.05 in.) nor more than 3.3 mm (0.13 in.) thick and are of a size which will permit cutting. Sheets are prepared directly by processing or from finished articles by cutting and buffing. If obtained from a manufactured article, the specimen should be free of surface roughness, fabric layers, etc. All specimens are cut so that the lengthwise portion of the specimens is parallel to the grain unless otherwise specified. In the case of sheets, the specimen should be 2.0±0.2 mm (0.08±0.008 in.) thick died out in the direction of the grain. In the present case, Die A is used to cut the specimens from the sheet with a single impact stroke (hand or machine) to ensure smooth cut surfaces.

Dumbbell specimens are marked with a bench marker, with no tension on the specimens at the time of marking. Marks are placed on the reduced section, equidistant from its center and perpendicular to the longitudinal axis. The between bench mark distance should be 50.00±0.5 mm (2.00±0.02 in.) for Die A. Three measurements are made for the thickness with one at the center and one at each end of the reduced section.

The median of the three measurements is used as the thickness in calculating the cross sectional area. Specimens with a difference between the maximum and the minimum thickness exceeding 0.08 mm (0.003 in.) are discarded. The width of the specimen is taken as the distance between the cutting edges of the die in the restricted section.

Straight specimens are prepared if it is not practical to cut either a dumbbell or a ring specimen as in the case of a narrow strip, small tubing or narrow electrical insulation material. These specimens should be of sufficient length to permit their insertion in grips used for the test. Bench marks are placed on the specimens. To determine the cross sectional area of straight specimens in the form of tubes, the mass, length, and density of the specimen may be required. The cross sectional area is calculated from these measurements as follows:

$$A = M/DL$$

where:
A=cross-sectional area, cm$^2$, M=mass, g,
D=density, g/cm$^3$, and
L=length, cm.

To determine tensile strength, the dumbbell or straight specimen is placed in the grips of the testing machine, using care to adjust the specimen symmetrically to distribute tension uniformly over the cross section. The rate of grip separation is 500±50 mm/min (20±2 in./min). The testing machine is started and the distance between the bench marks is recorded, taking care to avoid parallax. The force at the elongation(s) specified for the test and at the time of rupture is recorded. The elongation measurement is made preferably through the use of an extensometer, an autographic mechanism or a spark mechanism. At rupture, the elongation is measured and recorded to the nearest 10%.

The tensile strength is calculated as follows:

$$TS = F_{(BE)}/A$$

where:
TS=tensile strength, the stress at rupture, MPa (lbf/in.$^2$),
$F_{(BE)}$=the force magnitude at rupture, MN (lbf), and
A=cross-sectional area of unstrained specimen, m$^2$ (in.$^2$).

The elongation is calculated (at any degree of extension) as follows:

$$E = 100[L - L_{(o)}]/L_{(o)}$$

where:
E=the elongation in percent (of original bench mark distance),
L=observed distance between bench marks on the extended specimen, and
$L_{(o)}$=original distance between bench marks (use same units for L and $L_{(o)}$)
A test result is the median of three individual test measurements values for tensile strength and elongation.

In one embodiment, the polymer composition has a high tensile strength and elongation while remaining soft enough for contact with the skin, if needed, for applications such as wetsuits. Softness is determined according to ASTM D1056 which examines compression deflection values based on the force necessary to produce a 25% deflection on a test specimen. In one embodiment, the polymer composition has a compression deflection value in the range of about 1 psi to about 13 psi according to ASTM D1056. Preferably, the compression deflection is in the range of about 2 psi to about 9 psi according to ASTM D1056. Most preferably, the compression deflection is in the range of about 3 psi to about 6 psi according to ASTM D1056.

ASTM D1056 utilizes any compression machine that is capable of compressing the specimen at a rate of 12.5 to 50 mm/min (0.5 to 2 in./min) gently without impact. The machine may be motor- or hand-driven. The machine is be equipped with a gage to measure the deflection caused by the increase in load. The deflection is read on a dial gage graduated in 0.02 mm (0.001 in.), however, no gage is necessary if the machine automatically compresses the specimen to 25%.

Test specimen size may vary provided the indenter foot of the apparatus used is larger than the sample. Test specimens may be cylindrical or square but are cut so that opposite edges are parallel, either from the finished product or from standard test slabs or from flat sheets. The thickness of the test specimens is measured and recorded. The minimum thickness should be 6.0 mm (0.25 in.). Thin samples may be plied-up to obtain this thickness, or a standard test slab may be used. In closed-cell polymer compositions where thin sheet are split from thicker sheets there is usually very little difference between the thin sheet and thicker sheets.

Cellular rubber less than 6 mm (0.250 in.) in thickness are tested by plying up the proper number of plies to obtain a thickness as near 12.5 mm (0.50 in.) as possible. The standard test specimen is then compressed between the parallel metal plates of the machine until the thickness has been reduced 25% at which time a reading of the load is taken immediately. The test is repeated with the same specimen until the load readings do not change more than 5%. When repeating the test, the height of the specimen is not re-measured. The top and bottom plates should be at least 38 mm (1.5 in.) in diameter. The unit load required for the last reading, expressed in kilopascals (or pounds per square inch), is reported as the result of the compression-deflection test.

Density is determined according to ASTM D1056 based on the mass and volume of a specimen. The polymer composition has a density sufficient to provide insulation yet retain flexibility. For example, when utilized in a wetsuit, the polymer composition has a density sufficient to provide warmth to the user.

In one embodiment, the density is in the range of from about 3 lb/ft$^3$ to about 30 lb/ft$^3$ according to ASTM D1056. In a preferred embodiment, the density is in the range of from about 6 lb/ft$^3$ to about 12 lb/ft$^3$ according to ASTM D1056. Most preferably, the density is in the range of from about 8 lb/ft$^3$ to about 10 lb/ft$^3$ according to ASTM D1056.

According to ASTM D1056, density is determined based on the mass and volume of a specimen. Representative specimens of regular shape not less than 16 cm$^3$ (1 in.$^3$) in volume are cut from the sample to be tested. The specimen is weighed on a balance or scale graduated to permit weighing within ±1% of the mass to be measured. The volume of the specimen is determined to within ±1% of the sample either by direct measurement or volume displacement. The density is then calculated as follows:

$$\text{Density, kg/m}^3 = A/B$$

where:
A=mass of specimen, kg, and
B=volume of specimen, m$^3$.
The mass, volume, and density of each specimen as well as the average value are reported.

The polymer composition of this invention has the capability to deform yet substantially return to its pre-compressed configuration (i.e., compression set). Such a capability retains cold air from leaking around foam seals, such as those used in refrigerator units. In one embodiment, the compression set is less than 20% according to ASTM D1056. Preferably, the compression set is less than 15% according to ASTM D1056. Most preferably, the compression set is less than 10% according to ASTM D1056.

Maximum compression set is determined according to ASTM D1056. This test method measures the recovery properties of a sample when subjected to a constant deflection for a specified time/temperature/deflection by measuring its gage before and after the test period. Standard test specimens are used for this test and are cut so that opposite edges are parallel. The test specimens can be cut from standard test slabs or from commercial flat sheets. The thickness of the test specimens may vary, but is measured and stated in the resulting report. The minimum thickness for closed-cell expanded rubber shall be 12.5 mm (0.50 in.). The maximum thickness for closed-cell rubber shall be 19.05 (0.75 in.). Thin samples of closed-cell expanded rubber should not be plied up to obtain this thickness. Alternative test specimen sizes may be used for closed expanded material.

For closed-cell (expanded) rubber, the test specimens are compressed to 50%±1% of their original thicknesses. The load is released at the end of 22 hours±30 minutes and the thickness is measured after 24 hours at room temperature. Thicknesses up to and including 25.0 mm (1 in.) is measured using a dial-type gage having a maximum stem and foot mass of 25 g and a foot 30.0 mm (1.25 in.) in diameter. Thicknesses over 25 mm is measured using a sliding caliper gage. When a sliding caliper gage is employed, the gage setting is made with the gage out of contact with the cellular rubber. The sample is passed through the previously set gage and the proper setting occurs when the measuring faces of the gage contact the surfaces of the article without compressing it. The temperature of the test for closed-cell (expanded) rubber shall be 23±2° C. (73.4±3.6° F.), except for Class 2D rubber. For Class 1D and 2D rubber, the temperature of the test is 100±1° C. (212±1.8° F.). The time of the test must be as specified. Chromium-plated metal plates are not required and, thus, aluminum plates or any stiff plates that are clean and smooth, and that will not deflect measurably under the load necessary for deflection of the specimen, may be used. The resulting percent compression set is calculated as follows:

$$\text{Compression set, \%}=[(t_0-t_1)/(t_0-t_s)]\times 100$$

where:
$t_0$=original thickness,
$t_1$=thickness of specimen after specified recovery period, and
$t_s$=thickness of spacer bar used.

The duration and temperature of oven exposure, original and final thickness for the three specimens, the percent set for each specimen, and average percent set for the specimens are reported. The specimen size, if different than standard, is also reported.

The polymer composition can also deform yet substantially return to its pre-compressed configuration under elevated temperatures. In one embodiment, the elevated temperature compression set is not greater than 75% according to ASTM D3574. Preferably, the elevated temperature compression set is not greater than 60% according to ASTM D3574. Most preferably, the elevated temperature compression set is not greater than 50% according to ASTM D3574.

The elevated temperature maximum compression set can be determined according to ASTM D3574. This test method consists of deflecting the specimen to a specified deflection, exposing it to specified conditions of time and temperature and measuring the change in the thickness of the specimen after a specified recovery period. The compression device consists of two or more flat plates arranged so the plates are held parallel to each other by bolts or clamps and the space between the plates is adjustable to the required deflection thickness by means of spacers. The test specimens have parallel top and bottom surfaces and essentially perpendicular sides. The test specimens are 50 mm by 50 mm by 25 mm unless otherwise specified. Specimens less than 25 mm in thickness are plied up, without the use of cement, to a 25-mm thickness. Specimens greater than 50 mm in thickness shall be cut to 25 mm thickness from the core.

All measurements, conditioning, and recovery of the specimen at 23±2° C. are conducted in an atmosphere of 50±5% relative humidity. The oven conditions are 70±2° C. and 6% maximum relative humidity. This condition of relative humidity may be achieved by placing an oven at 70±2° C. in an atmosphere maintained at 23±2° C. and 50±5% relative humidity. The original thickness of the test specimen is measured. Next, the test specimen is placed in the apparatus and deflected to either 50±1, 75±1, or 90±1% of its thickness. Within 15 min, the deflected specimen and the apparatus are placed in a mechanically convected air oven for a period of 22 hours. The apparatus is then removed immediately from the apparatus. The final thickness is measured after allowing the specimen to recover 30 to 40 min at the temperature and humidity conditions specified above. Three specimens per sample are tested. The mean compression set value of these specimens is calculated and recorded.

The compression set value can be calculated two ways. In one instance, the constant deflection compression set is calculated and expressed as a percentage of the original thickness, as follows:

$$C_t=[(t_o-t_f)/t_o]\times 100$$

where:
$C_t$=compression set expressed as a percentage of the original thickness,
$t_o$=original thickness of test specimen, and
$t_f$=final thickness of test specimen.

In a second instance, the constant deflection compression set is calculated and expressed as a percentage of the original deflection, as follows:

$$C_d=[(t_o-t_f)/(t_o-t_s)]\times 100$$

where:
$C_d$=compression set expressed as a percent of the original deflection,
$t_o$=original thickness of test specimen,
$t_s$=thickness of spacer bar used, and
$t_f$=final thickness of test specimen.

The compression set as $C_t$ or $C_d$, and deflection are reported along with any non-standard recovery periods or sample sizes and whether the sample was cored, uncored, molded or a combination thereof.

In a preferred embodiment, the polymer composition is flexible even when exposed to low temperatures. This property is especially beneficial when used in various industrial seals as well as in wetsuits. Preferably, the polymer composition retains flexibility, does not become brittle and shows no signs of cracking when subjected to the low temperatures according to ASTM D1056.

According to ASTM D1056, a low-temperature chamber capable of −75° C. (−103° F.) that can be accurately controlled for low temperatures is utilized to test the specimens. If the box is cooled by dry ice, the specimen should not make direct contact with gaseous $CO_2$. The chamber must be large enough to permit the bending of the test piece while it is still in the box. Mandrel diameter should be approximately four times the sample thickness. The test specimens should be 50±10 mm (2±0.5 in.) wide by 140±10 mm (6±0.5 in.) long by 3 mm (0.125 in.) to 12.5 mm (0.50 in.) thick.

Three test specimens and mandrel are placed in a low temperature chamber for 5±0.25 h at −40° C. (−40° F.), −55° C. (−67° F.), or −75° C. (−103° F.) as specified by the suffix letter and number (e.g., F1, F2 and F3, respectively). At the end of the test period, the cold box is opened and the specimen is bent 180° around the mandrel taking no longer than two to three seconds to perform the bend. If there are multiple samples, the sample is bent and the results should be recorded as soon as possible to maintain temperature to within ±5° C. of the set temperature. The report should note whether the sample showed any indication of cracking or if it was still pliable.

The polymer compositions also resist cracking when exposed to atmosphere containing ozone. Elastomeric materials, upon exposure to ozone, are especially susceptible to cracking. Cracking is problem in various industrial applications such as fuel lines, seal, gaskets and rings. In a preferred embodiment, the present polymer compositions resist cracking when exposed to ozone under conditions set forth in ASTM D1149.

In conducting ASTM D1149, various standard specimens are appropriate including:

Specimen A—a rectangular strip, 25 by 150 mm (1 in.×6 in.), having a thickness between 1.9 and 2.5 mm (0.075 in. and 0.10 in.). This specimen is tested at 20% elongation unless otherwise specified.

Specimen B—a rectangular strip, 25 by 95 mm (1 by 3.75 in.), having a thickness between 1.9 and 2.5 mm (0.075 and 0.10 in) and tested in the form of a bent loop.

Specimen C—a tapered strip, shown in FIG. 2, having a thickness between L9 and 2.5 mm (0.075 and 0.10 in.) and tested in extension at 10, 15, or 20% elongation as specified; the actual elongation increases from the wide to the narrow end of the specimen.

Other types of specimen may be tested, but the results may not agree with tests made with standard specimens. Unless otherwise specified, the specimen is prepared with the grain in the length direction and duplicate specimens are tested.

The ozone chamber is, first, adjusted to conditions for exposure. Standard ozone pressures are 25 mPa, 50 mPa, 100 mPa, and 200 mPa with a ±10% tolerance on each pressure. The ozone concentration or partial pressure is measured once a day for routine work and more often for special test conditions. Such a measurement is made with the ozone chamber loaded with the specimen. If specimens are loaded into a chamber that has been exhausted of ozone, the ozone concentration should reach ±10% of the selected ozone concentration within 15 minutes after the start of exposure. Since new specimens tend to absorb ozone rapidly, a drop in ozone concentration may be noted in chambers that are not exhausted when they are first loaded. Generation and control of ozone to the chamber also should recover to ±10% of the selected partial pressure within 15 minutes. These criteria may limit the number of new samples loaded at one time for a given test chamber.

The standard test temperature is 40° C. (104° F.). In the present case, a temperature of 38° C. was used. Any other temperature may be chosen for the test and the associated conditioning. All rubber sheets for ozone testing are vulcanized between aluminum foil 0.05 mm (0.002 in.) in thickness or polyester film of similar thickness. These films will mildly adhere to most commercial rubbers. At the time specimens are cut for ozone testing, the foil or film can be easily removed providing a fresh surface. The foil or film covered sheets should be stored for a minimum of three hours at the agreed test temperature.

The protective foil or film is stripped off and specimens A and C are extended to the prescribed elongation. The specimens are then fastened to holders that are inert to ozone (for example, metal or lacquered wood). Specimen B is then bent in the form of a loop and fastened in a holder inert to ozone. Conditioning is initiated immediately after mounting specimens. For normal testing, the mounted specimens are conditioned for 24 hours in an ozone-free atmosphere at the temperature at which they are to be exposed to ozone. The time of exposure to ambient conditions during transfer to the ozone test chamber should be minimized, which shall have been preset to the agreed test temperature.

Finally, observations are made to detect the appearance of cracking with sufficient frequency to be able to detect the first appearance of ozone cracking. The frequency will depend on the resistance to ozone attack of the rubbers being tested. Cracking is observed under a magnification of 7×. When comparisons are being made with a standard reference material, exposures may be made for a fixed time. The degree of cracking can be evaluated using an agreed upon scale.

The reported information can include: identification of materials tested; ozone partial pressure or concentration, in mPa, both nominal and that actually measured on a daily basis; temperature of test; condition period and temperature, in particular whether 24 hours or one hour was used; type of specimen used and elongation or mounting during a test; and time to the first observed cracking, or a description of the character of the ozone cracks at various periods of exposure.

In one embodiment, a cracking index is calculated for the specimen as follows:

$$\text{Cracking Index} = \frac{[\text{Test time (e.g., 24 hours)} - \text{time until first crack appears}]}{\text{Test time}}$$

In one embodiment, the polymer composition has a cracking index of less than 1. In another embodiment, the polymer composition has a cracking index of less than 0.5. In yet another embodiment, the polymer composition has a cracking index of 0.1.

The resilience of a material can be determined via ASTM D2632 which sets forth a determination of impact resilience of solid rubber based on the vertical rebound of a dropped mass. Resilience is determined as the ratio of rebound height to drop height of a metal plunger of prescribed mass and shape which is allowed to fall on the rubber specimen. The testing apparatus includes means for suspending a plunger at a given height above the specimen. The plunger can have the dimensions set forth in FIG. 1 of ASTM 2632 with a mass of 28±0.5 g. The height of the drop point and of the resilience scale above the base of the instrument is adjustable so that the drop height is always 400±1 mm (16±0.04 in.) above the specimen surface. The resilience scale is marked in 100 equally spaced divisions. The top of the plunger is in line with 100 on the scale when the plunger is locked in the elevated position. The descent of the plunger and its ensuing ascent (rebound) is guided by a vertical rod (plunger guide). In order to minimize friction between the plunger and the vertical rod, a means is provided for leveling the base of the instrument and adjusting the perpendicularity of the vertical rod to the instrument base. The bottom of the vertical rod shall have a 4 mm diameter sharp point formed by a 60° angle, to secure the location of the bottommost end of the vertical rod. This point indents the test specimen, providing a secure location for the free end of the guide rod. The plunger is allowed to rest at the lowest point of travel and act as a guide to position the rod in the center of the stabilizer, as is visually practical under 10× magnification, as it is lowered onto the test specimen. An opaque shield may be mounted between the operator and the plunger scale to be used for pass-fail test determinations. In use, the shield is adjusted so that its upper edge (or central-most graduation within a range) is even with the desired test determination. If the top of the rebounding plunger is visible above the shield (or within graduations demarcating a predetermined range of acceptability), the specimen passes.

The standard test specimen has a thickness of 12.5-±0.5 mm (0.50-±0.02 in.). The specimen is cut from a slab or specifically molded so that the point of plunger impact is a minimum distance of 14 mm (0.55 in.) from the edge of the specimen. Alternative specimens may be prepared by plying samples cut from a standard test slab. These samples are plied, without cementing, to the thickness required. Such plies are smooth, flat, and of uniform thickness. The results obtained with these specimens will not necessarily be identical with those obtained using a solid specimen of the same material and state of cure. A thin specimen reaches a higher state of cure at a given time and temperature of cure than does a thicker specimen. Therefore, if plied specimens are used, their cure time is appropriately lower than that of unplied specimens used for comparison.

To test a specimen, the instrument is leveled and the plunger is raised to the top of its guide rod. The resilience scale is positioned so that its full mass rests upon the specimen and then locked it in this position. The plunger is then released ensuring that it slides freely on the vertical rod. Three specimens are tested from the same sample, making six test determinations on each specimen. The specimen is not repositioned once the initial test determination has been made. The first three test determinations are not recorded, as these condition and stabilize the specimen. Instead, the last three test determinations are recorded.

The instrument scale is divided into 100 equal parts, therefore a test determination is equal to the resilience value in percent. The 4th, 5th, and 6th test determinations are averaged from a specimen to calculate the test result from the specimen. The average or, alternatively, the median are determined from the three specimens to the nearest whole number. This whole number is the resilience value of the sample.

The present invention also provides a process for preparing the polymer composition. The process has the advantage of not requiring the use of expensive (and dangerous) manufacturing machinery such as banburys, roller mills and extruders. In one embodiment, the process comprises the step of blending components including a polyisocyanate with a polyester, a polyether polyol, or both a polyester and a polyether polyol.

Various polyisocyanates can be blended. In one embodiment, the polyisocyanate is at least one diisocyanate. In one embodiment, suitable diisocyanates include, but are not limited to, substituted and isomeric mixtures including 2,2'-, 2,4'-, and 4,4'-diphenylmethane diisocyanate (MDI) and toluene diisocyanate (TDI). In one embodiment, saturated isocyanates include aliphatic, cycloaliphatic, araliphatic, derivatives thereof, and combinations of these compounds having two or more isocyanate (NCO) groups per molecule. The isocyanates may be organic, modified organic, organic polyisocyanate-terminated prepolymers, and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

In one embodiment, the polyisocyanate is at least one diisocyanate having the generic structure: O=C=N—R—N=C=O, where R is preferably a cyclic or linear or branched hydrocarbon moiety containing from about 1 to 20 carbon atoms. The diisocyanate may also contain one or more cyclic groups. When multiple cyclic groups are present, linear or branched hydrocarbons or a combination thereof containing from about 1 to 10 carbon atoms can be present as spacers between the cyclic groups. In some cases, the cyclic group(s) may be substituted at the 2-, 3-, or 4-positions, respectively, as well as combinations thereof. Substituted groups may include, but are not limited to, halogens, primary, secondary, or tertiary hydrocarbon groups, or a mixture thereof.

In one embodiment, the polyisocyanate is at least one saturated diisocyanate. Suitable examples of saturated diisocyanates include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophoronediisocyanate (IPDI); triisocyanate of HDI; triisocyanate of 2,2,4-trimethyl-1,6-hexane diisocyanate (TMDI); 4,4'-docyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof, modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}$MDI), 1,6-hexamethylene diisocyanate (HDI), or a combination thereof.

The number of unreacted NCO groups in the polyurethane prepolymer may be varied to control such factors as the speed of the reaction and the resultant hardness of the composition. In one embodiment, the number of unreacted NCO groups in the polyurethane prepolymer of isocyanate and polyol may be less than about 14%. In one embodiment, the polyurethane prepolymer has from about 5% to about 11% unreacted NCO groups. In another embodiment, the polyurethane prepolymer has from about 6% to about 9.5% unreacted NCO groups. In yet another embodiment, the percentage of unreacted NCO groups is about 3% to about 9%. In another embodiment, the percentage of unreacted NCO groups in the polyurethane polymer may be about 7.5% or less, and more preferably, about 7% or less. In yet another embodiment, the unreacted NCO content is from about 2.5% to about 7.5%, and more preferably from about 4% to about 6.5%.

In one embodiment, the polyisocyanate is at least one unsaturated diisocyanate, i.e., aromatic compound. In a preferred embodiment, unsaturated diisocyanate compounds are preferably coupled with at least one light stabilizer or pigment or a combination thereof. Suitable examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI, carbodimide-modified liquid 4,4'-diphenylmethane diisocyanate, para-phenylene diisocyanate (PPDI), meta-phenylene diisocyanate (MPDI), triphenylmethane-4, 4'-, and triphenylmethane-4,4"-triisocyanate, napthylene-1, 5,-diisocyanate, 2,4'-, 4,4'-, and 2,2-biphenyl diisocyanate, polyphenyl polymethylene polyisocyanate (PMDI), and mixtures thereof.

In one embodiment, the polyisocyanate is present at a concentration of between about 20 phr and about 80 phr. As referred to herein, the unit "phr" refers to the parts, by weight, per hundred parts of polymer base. In another embodiment, the polyisocyanate is present at a concentration of between about 30 phr and about 70 phr. In another embodiment, the polyisocyanate is present at a concentration of between about 40 phr and about 60 phr.

In one embodiment, any saturated polyol available to one of ordinary skill in the art that is capable of blending with a polyisocyanate and at least one amine catalyst or at least one chemical blowing agent or a combination thereof, may be used. In one embodiment, suitable polyols include, but are not limited to, polyether polyols, polycaprolactone polyols, polyester polyols, polycarbonate polyols, hydrocarbon polyols, and mixtures thereof. Polyester polyols tend to provide the polymer foam with higher tensile, tear and elongation, improved resistance to oils, solvents and oxidation. Polyether polyols tend to provide the polymer foam with lower cost, improved resistance to acids, bases and hydrolysis.

Suitable saturated polyether polyols for use in the present invention include, but are not limited to, polytetramethylene ether glycol (PTMEG); copolymer of polytetramethylene ether glycol and 2-methyl-1,4-butane diol (PTG-L); poly (oxyethylene)glycol; poly(oxypropylene)glycol; poly(ethylene oxide capped oxypropylene)glycol; and mixtures thereof.

In one embodiment, saturated polycaprolactone polyols may be blended. Suitable saturated polycaprolactone polyols include, but are not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

In one embodiment, saturated polyester polyols may be blended. Suitable saturated polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; and mixtures thereof. In one embodiment, the polycarbonate polyol may be poly(hexamethylene carbonate) glycol.

In one embodiment, hydrocarbon polyols may be blended. Suitable hydrocarbon polyols include, but are not limited to, hydroxy-terminated liquid isoprene rubber (LIR), hydroxy-terminated polybutadiene polyol, saturated hydroxy-terminated hydrocarbon polyols, and mixtures thereof. Other aliphatic polyols that may be used include, but are not limited to, glycerols; castor oil and its derivatives; Kraton polyols; acrylic polyols; acid functionalized polyols based on a carboxylic, sulfonic, or phosphoric acid group; dimer alcohols converted from the saturated dimerized fatty acid; and mixtures thereof.

The blended components may contain about 10% to about 20% by weight free isocyanate monomer. Thus, in one embodiment, the blended components may be stripped of the free isocyanate monomer. In one embodiment, the blended components may contain about 1% or less free isocyanate monomer after stripping. In another embodiment, the blended components contains about 0.5% by weight or less of free isocyanate monomer.

In one embodiment, the polyester or polyether polyol or a combination thereof is present at a concentration of from about 50 phr to about 150 phr. In another embodiment, the polyester or polyether polyol or a combination thereof is present at a concentration of from about 75 phr to about 125 phr. In another embodiment, the polyester or polyether polyol or a combination thereof is present at a concentration of from about 95 phr to about 105 phr.

In one embodiment, a catalyst is blended with a polyisocyanate and either a polyether polyol or a polyester or a combination thereof. In one embodiment, the catalyst is an amine. In another embodiment, the catalyst is a hydroxyl catalyst. In another embodiment, the catalyst is a thiol catalyst. In another embodiment, the catalyst is present at a concentration of about 0.01 to about 0.28 phr. In one embodiment, the catalyst is present at a concentration of between about 0.05 to about 0.20 phr. In yet another embodiment, the catalyst is present at a concentration of about 0.8 to about 0.12 phr.

In one embodiment, a chemical blowing agent is blended with a polyisocyanate and either a polyether polyol or a polyester or a combination thereof and, optionally, an amine catalyst. In one embodiment, a variety of blowing agents can be used. In one embodiment, suitable blowing agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate.

In one embodiment, the blowing agent can be forced or injected into the polymeric mixture during the step of blending components. In another embodiment, the blowing agent is forced or injected in the polymer composition in the subsequent curing process. A gas, such as air, nitrogen, carbon dioxide, etc., can also be forced or injected into the composition during the mixing or curing process.

In one embodiment, the blowing agent is present at a concentration of between about 1 and about 20 phr. In another embodiment, the blowing agent is present at a concentration of between about 3 and about 15 phr. In yet another embodiment, the blowing agent is present at a concentration of between about 6 and about 9 phr.

In one embodiment, the process includes the step of blending hollow or expandable microspheres with the composition, either during or before the molding process. Polymeric, ceramic, metal, and glass microspheres are useful in the invention, and may be solid or hollow and filled or unfilled. In particular, microspheres up to about 1000 micrometers in diameter are useful.

In one embodiment, a chemical blowing agent, such as azodicarbonamide, activators, and dispersants, and a polyester resin is blended. In one embodiment, the polymeric mixture is further blended or mixed, for example, in a high shear mechanical mixer, with a diol or polyol, such as butanediol, an amine catalyst and MDI.

In one embodiment, at least one activator compound is mixed with the blowing agent. In one embodiment, an activator is used to extend the range of temperatures within which the blowing agent might effectively be used for the expansion of the polymeric mixture. The activator catalyzes the decomposition of the blowing agent, causing it to decompose, and thus evolve gases at temperatures below its normal decomposition temperature. In one embodiment, the activator is present at a concentration of between about 0.1 phr and about 1.5 phr. In another embodiment, the activator is present at a concentration of between about 0.2 phr and about 1.0 phr. In yet another embodiment, the activator is present at a concentration of between about 0.3 phr and about 0.45 phr.

In a preferred embodiment, the polymeric mixture is continuously dispensed onto a moving conveyor. The speed of the conveyor and the rate at which the materials are being dispensed can be carefully controlled and monitored throughout the process to provide optimal results. That is, the speed of the conveyor and the rate at which the material is dispensed determines the thickness of the elastomer. Thinner materials require less heat, dwell time or both heat and dwell time for preheating and blowing agent activation. Thicker materials require more heat, dwell time or both heat and dwell time. Thickness variation, for example, of more than about 25%, within a given area can cause significant variation in the final physical properties.

The process of preparing the polymer composition further comprises the step of curing the blended components to form a polymeric mixture. In one embodiment, the step of curing the components to form a polymeric mixture is accomplished in the presence of at least one curing agent. In on embodiment, suitable curing agents include, but are not limited to, hydroxy terminated curing agents, amine-terminated curing agents, and mixtures thereof. Depending on the type of curing agent used, the polyurethane composition may be thermoplastic or thermoset in nature. In one embodiment, polyurethane composition is cured with a diol or secondary diamine with 1:1 stoichiometry resulting in thermoplastic properties. Thermoset polyurethanes, on the other hand, are generally produced from a prepolymer cured with a primary diamine or polyfunctional glycol.

The type of curing agent used determines whether the polyurethane composition is polyurethane-urethane or polyurethane-urea. In one embodiment, a polyurethane prepolymer cured with a hydroxy-terminated curing agent is polyurethane-urethane because any excess isocyanate groups will react with the hydroxyl groups of the curing agent to create more urethane linkages. In another embodiment where an amine-terminated curing agent is used with a polyurethane prepolymer, the excess isocyanate groups will react with the amine groups of the amine-terminated curing agent to create urea linkages.

In one embodiment, the polymeric mixture forms a relatively soft elastomer. In a preferred embodiment, the elastomer is a saturated aromatic or aliphatic polyurethane. In one embodiment, the saturated aromatic or aliphatic polyurethane is the product of a reaction between at least one saturated diisocyanate, at least one saturated polyol, and at least one saturated curing agent.

In one embodiment, suitable saturated hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; triisopropanolamine; diethylene glycol di-(aminopropyl)ether; 1,5-pentanediol; 1,6-hexanediol; glycerol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900; and mixtures thereof.

In one embodiment, the hydroxy-terminated curing agent has a molecular weight of at least 50. In another embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; N,N,N',N'-tetrakis (2-hydroxypropyl)-ethylene diamine; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imidobis-propylamine; monoethanolamine, diethanolamine; triethanolamine; monoisopropanolamine, diisopropanolamine; triisopropanolamine; isophoronediamine; and mixtures thereof. In one embodiment, the amine-curing agent has a molecular weight of at least 60. In another embodiment, the molecular weight of the amine-curing agent is at least 1000. In yet another embodiment, the molecular weight of the amine-curing agent is about 2000.

In one embodiment, the process for preparing the polymer composition further comprises the step of heating the polymeric mixture to form the polymer composition. In one embodiment, the polymeric mixture is heated to a first temperature above the softening temperature of the polymer mixture. In one embodiment, the first temperature is maintained below the activating temperature of any chemical blowing agent present in an effort to soften the polymer composition. In one embodiment, the material is then heated, for example, in a multi-zoned conveyorized expansion oven. In a preferred embodiment, there are several temperature zones in the oven. The temperature settings in the initial zones are selected to preheat and soften the elastomer, and typically range from about 100 to about 150° C., although these ranges can vary depending on the type of elastomer and blowing agent. In a preferred embodiment, the entire cross section of the elastomer is heated to an even temperature below the degradation and activation temperature of any chemical blowing agent present. In a preferred embodiment, the chemical blowing agent is azodicarbonamide.

The process for preparing the polymer composition can further comprise the step of heating to a second temperature sufficient to activate or degrade any blowing agent. In one embodiment, the temperature in various zones of the oven is ramped up to between about 160 and about 180° C. to initiate activation (e.g., gradual degradation) of the blowing agent, if a chemical blowing agent is used. Gas is generated as a result of the activation of the blowing agent (nitrogen is the gas in the case of azodicarbonamide). In one embodiment, the generated gas serves as the mechanism for expansion of the polymer composition's elastomer to a foam. In one embodiment, the polymer foam includes closed cells, but has less rigidity than conventional closed cell polyurethane foams.

In addition to the polymerizable constituents, various dispersants, dyes, pigments, fire retardants, anti-microbials, UV and gas fade stabilizers, anti-static additives, cross linkers, or a combination thereof can be blended in the polymer composition. In one embodiment, the use of a light stabilizer is preferred, for instance, for compositions having a difference in yellowness (*Y) of about 15 or greater, but also may be added to compositions having a difference in yellowness of from about 12 to about 15. As used herein, light stabilizer may be understood to include hindered amine light stabilizers, ultraviolet (UV) absorbers, and antioxidants.

In one embodiment, suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba-Geigy. In one embodiment, the light stabilizer is UV absorber TINUVIN® 328, which is useful with aromatic compounds. In another embodiment, hindered amine light stabilizer TINUVIN® 765 is used with aromatic or aliphatic compounds.

In one embodiment, dyes, as well as optical brighteners and fluorescent pigments can also be included in the polymer compositions. In one embodiment, a dye is optionally blended, at a concentration of between about 0.1 phr and 3.6 phr. In another embodiment, the dye is optionally blended, at a concentration of between about 0.4 phr and 2.4 phr. In yet another embodiment, the dye is optionally blended, at a concentration of between about 0.8 phr and 1.2 phr. One of ordinary skill will appreciate that the actual amounts can be expected to vary depending on the desired color.

In one embodiment, the polymer composition includes only saturated components because unsaturated components yellow over a period of time. Addition of UV absorbers and light stabilizers to any of the above compositions may help to maintain the tensile strength, elongation, and color stability. The use of light stabilizing components also may assist in preventing cover surface fractures due to photo-degradation. Thus, suitable UV absorbers and light stabilizers, as listed above, may also be included in the compositions described herein.

In one embodiment, at least one fragrance or masking component is added to the polymer composition described herein. In one embodiment, the fragrance component is preferably added in an amount of about 0.001% to about 3.0% based on the total weight of the composition. In another embodiment, the fragrance component is preferably added in an amount of about 0.005% to about 2.0% based on the total weight of the composition. In yet another embodiment, the fragrance component is preferably added in an amount of about 0.01% to about 1.5% based on the total weight of the composition.

In one embodiment, suitable fragrance components include, but are not limited to, Long Lasting Fragance Mask #59672, Long Lasting Fragance Mask #46064, Long Lasting Fragance Mask #55248, Non-Descript Fragrance Mask #97779, Fresh and Clean Fragrance Mask #88177, and Garden Fresh Fragrance Mask #87473, all of which are manufactured by Flavor and Fragrance Specialties of Mahwah, N.J. Other non-limiting examples of fragrance components that may be added to the compositions include benzaldehyde, benzyl benzoate, benzyl propionate, benzyl salicylate, benzyl alcohol, cinnamic aldehydes, natural and essential oils derived from botanical sources, and mixtures thereof.

In one embodiment, these additives can be added to keep any fillers and pigments wetted and well dispersed in the formulation, as well as providing other functional uses such as water absorbency. Suitable examples include carboxylate, ethoxylate and sulfonate-based materials, e.g., Tamol® L, Tamol® 731A, Morcryl® (all from Rohm and Haas). Representative dispersants include a polyacrylic acid or its salt (e.g., sodium polyacrylate) or derivatives, such as PD9000, an anionic polyester surfactant (ICI Americas, Inc., Wilmington, Del.) and Solsperse® 32000 (Avecia, Inc., Wilmington, Del.). In one embodiment, these additives provide coloring to the polymeric composition. These include organic and inorganic pigments and dyes, examples of which include phthalocyanine blue, iron oxide, carbon black, and indigo.

In one embodiment, fire-retardant materials can be incorporated into the polymer composition. In one embodiment, there are a variety of inorganic carbonates and oxides, including calcium carbonate, which form carbon dioxide or water when heated, that can act as fire retardants. If desired, organic fire-retardant materials, such as halogenated aromatics can be added.

In one embodiment, antimicrobial properties can be incorporated into the polymer composition. In one embodiment, the polymer composition is impregnated with antimicrobial agents, such as antibiotics, quaternary ammonium compounds, silver ions, or iodine, that are gradually released into the surrounding solution over time and kill microorganisms (Medlin, J. (1997) Environ. Health Persp. 105, 290 292; Nohr, R. S. & Macdonald, G. J. (1994) J. Biomater. Sci., Polymer Edn. 5, 607 619 Shearer, A. E. H., et al (2000) Biotechnol. Bioeng. 67, 141 146.). One representative example of a suitable antimicrobial agent is Ultrafresh® DM-50 (Thompson Research).

In one embodiment, at least one chain extender is added to the mixture before curing. In one embodiment, the chain extender is added to form a polymer composition comprising a closed cell polymer foam. In one embodiment, chain extending agents include any material that is reactive with an isocyanate in the primary urethane material and will polymerize in a head to tail arrangement with monomer units. When the functional group is hydroxy, the chain extension agent includes, but is not limited to, lactones and hydroxy carboxylic acids. Preferred lactones are epsilon-caprolactone and butyl lactone. A preferred carboxylic acid is 12-hydroxydodecanoic acid. The extending agent can also be an oxirane-functional material, such as alkylene oxides. Preferred oxirane functional materials include, but are not limited to, ethylene oxide and propylene oxide. Optionally, the extending agent is asymmetrical.

In one embodiment, a chain extending agent with having difunctional reactivity with an isocyanate may be incorporated with the polymer composition. In such an embodiment, the chain extending agent can have at least two reactive groups that react with isocyanate groups and which can be reacted with the other reaction materials. Preferably, there are two reactive groups per chain extension agent. Preferably, the reactive groups are hydroxyl, amine, thiol, and combinations thereof. More preferably, the reactive groups are hydroxyl. In one embodiment, the material can have a pendant alkyl chain. The pendant alkyl chain is the portion of the molecule that is opposite of the terminal reactive group and at a location beyond where the secondary reactive group attaches to the molecule. In one embodiment, the chain extension agent can contain heteroatoms, such as O, N, and Si. In one embodiment, the chain extension agent can be asymmetrical.

Various chain extension agents may be utilized. In one embodiment, suitable examples of chain extension agents include, but are not limited to, $C_{2-10}$ diols such as butanediol, 2-ethyl-1,3 hexanediol, 2-methyl-2,4-pentane diol, 2,2,4-trimethyl-1,3-pentanediol, 2,4-diethyl-1,5-octanediol, 1-hydroxymethyl cyclohexan-4-ol, 1-amino-hexan-6-ol, 2-ethyl-3-N-methyl-1,3-hexanediamine, isomers of these materials, and mixtures thereof. Examples of the chain extension agent with at least two functional groups that have the same reactivity with respect to each other include, but are not limited to, 1,6-hexane diol and 1,10-decane diol. Examples of asymmetrical chain extension agents include 2-methyl-1,6-hexane diol and 3-methyl-1,10-decane diol.

In one embodiment, the at least one chain extender is a $C_{2-10}$ diol. In another embodiment, the chain extender is a triol In one embodiment, the chain extender is present at a concentration of between about 1 and about 23 phr. In one embodiment, the chain extender is present at a concentration of between about 2.5 and about 15 phr. In one embodiment, the chain extender is present at a concentration of between about 5 and about 7.5 phr.

In one embodiment, the $C_{2-10}$ diol, such as butane diol, is used a curing agent when no additional resin or polyol is present. In one embodiment, the $C_{2-10}$ diol is added to the resin or polyol to act as a chain extender. By simply eliminating the chain extender, the process described herein may produce closed cell foams of varying softness levels (i.e., significantly softer than other conventional closed cell foams).

In one embodiment, the presence of polyols (i.e., molecules which include more than two hydroxyl groups) or polyisocyanates (i.e., molecules which include more than two isocyanate groups) or a combination thereof can help to cross-link the polymeric material. In one embodiment, glycerine may be used as a cross-linker. Other suitable examples include ethylene glycol, propylene glycol, or pentaerythritol or a combination thereof. In one embodiment, cross-linking can be achieved using chemical agents that produce free radicals and by using multifunctional monomers. (see, for example, Szycher's Handbook of Polyurethanes, CRC Press, LLC, Copyright 1999).

A foam embodiment of the polymer composition can be used in various applications, for example, in wet suits, diving suits and orthotic brace materials. The closed cell polyurethane foam can be skived into thin rolls (typically 2-3 mm thick) and laminated to fabrics (lycra, spandex, light weight nylons and polyesters, and the like). The resulting laminate can then be cut, sewn and finished into a final form. The choice of reactants or reaction conditions or both reactants and reaction conditions can easily be modified to generate closed cell foams suitable for a variety of other applications and industries, including automotive, footwear, printing, medical, apparel, and other applications.

In one embodiment, the foam polymer composition acts as a "spring" for reflectors on paved roads. In this application, a softer foam is preferred, with a relatively larger cell structure than for other applications. For example, a suitable softness is on the order of between about 0.5 psi and 2.0 psi compression deflection. The density is typically between about 6 and about 8 lbs/ft$^3$, and the compression set is less than 25%. In another embodiment, the compression set is less that less than 20%. In yet another embodiment, the compression set is preferably less than 15%.

In one embodiment, the polymer composition is utilized in die ejection materials. In this application, the materials tend to have a relatively higher density and may be used in the foam embodiment. In one embodiment, the foams tend to be firm, with a compression deflection ("CD") of between about 8 psi and about 15 psi. They also have a relatively high density, between about 10 lbs/ft$^3$ and about 20 lbs/ft$^3$, and a relatively low compression set. In one embodiment, the compression set is less that 15%. In another embodiment, the compression set is less than 10%. In yet another embodiment, the compression set is less that 5%.

In one embodiment, in the polymer composition foam can be used as seals, such as those used in refrigerator units. In this application, the materials tend to have a medium hardness, typically in the range of between about 5 psi and about 10 psi CD. They also tend to have a medium density, between about 8 and about 12 lbs/ft$^3$, and a relatively low compression set (i.e., less than 15%).

The desired applications for the foam will depend, in part, on the properties of the foam itself. Using the processes described herein, one can produce a polymer composition or foam with a density in the range of between about 3 lb/ft$^3$ and about 30 lb/ft$^3$. In another embodiment, the polymer composition or foam has a density in the range of between about 6 lb/ft$^3$ to about 12 lb/ft$^3$. In yet another embodiment, the polymer composition or foam has a density in the range of between about 8 lb/ft$^3$ to about 10 lb/ft$^3$.

In one embodiment, the polymer composition or foam has a hardness of between about 0.5 psi and about 100 psi. In another embodiment, the polymer composition or foam has a hardness of between about 1 psi and about 7 psi. In yet another embodiment, the polymer composition or foam has a hardness of between about 3 psi and about 5 psi.

In one embodiment, the pore size of the resulting polymer composition or foam can be at least 10 pores per inch (ppi). In another embodiment, the pore size is at least 50 ppi. In yet another embodiment, the pore size is at least 70 ppi.

The present invention will be better understood with reference to the following non-limiting example.

EXAMPLES

Example 1

Preparation of an Elastomeric Foam Suitable for Use in Preparing Wet Suits and Orthotics (Orthopedic Soft Goods)

The purpose for this example was to prepare an elastomeric foam with properties suitable for wet suits and orthotics. There are several desired physical characteristics for these materials. One of the characteristics is softness (compression deflection at 25%) determined via ASTM D1056. The values are generally in the range of about 1 psi to about 7 psi and, preferably, in the 3 psi to 5 psi range.

Another characteristic is low to medium density, which is in the range of from about 6 to about 12 lb/ft$^3$. Preferably the density is in the range of from about 8 to about 10 lb/ft$^3$. An additional desired properties includes low compression set which is determined according to ASTM D1056 The compression set should be less than 15% for this application.

Preferably, the compression set is less than 10%. A high elongation, i.e., greater than 250% (ASTM D412) is also preferred. More preferably, the elongation is greater than 350%. The material should be elastic, i.e., it can be stretched repeatedly to 150% or more of the initial length and will return rapidly and with force to the approximate original length, and should have a fine cell structure, i.e., greater than 50 ppi (pores per inch), as well as a pore size of greater than 70 ppi.

The material should have relatively low water absorption, i.e., less than 6% (ASTM D1056). Preferably, the water absorption is less than 4%. The composition should also have a high resilience, i.e., greater than 35% (ASTM D2632). Preferably the resilience is greater than 40%.

Table 1 summarizes a formulation that was used to prepare an elastomeric foam.

TABLE 1

Formulation

| Component | Type/Compound(s) | Trade name/Source | Amount |
|---|---|---|---|
| Ester Resin | Polyester Polyol, Adipic Acid/Diethylene Glycol/Glycerine Crosspolymer | Inolex 1931-50 (available from Inolex Chemical Company) | 100.000 phr |
| Blowing Agent | Azodicarbonamide, Diazenedicarboxamide | Ritchem AC1000 (available from Rit-Chem Co, Inc) | 7.500 phr |
| Activator | Surface treated urea | Ritchem Cellex A (available from Rit-Chem Co, Inc) | 0.375 phr |
| MDI Prepolymer | Modified 4,4'-diphenylmethane-diisocyanate | Suprasec 2543 (available from Huntsman) | 50.400 phr |
| Chain Extender | 1,4 Butanediol | 1,4-Butylene Glycol (available from BASF) | 6.250 phr |
| Catalyst | Delayed Action Amine Catalyst | Niax ™ A-537 (available from GE OSi Silicones) | 0.10% |
| Dye | Nonionic polymeric colorant blend | Milliken Black 454SS or Black X-77 (available from Milliken Chemicals, Spartanburg, SC) | 1.00% |

The material was blended and passed through an oven with a series of zones, each zone having its own temperature and its own length. The material was passed through each zone at a predefined speed, to provide a predetermined dwell time at the particular temperature. The zones, temperatures, length of the zones, speed at which the material passed through the zones, and the dwell times, are provided below in Table 2.

TABLE 2

Oven Settings

| Zone | Temp, ° F. | length, ft. | Ft/min | dwell, min. |
|---|---|---|---|---|
| 1b | 310 | 30 | 3.00 | 10.0 |
| 2a | 310 | 30 | 3.00 | 10.0 |
| 2b | 310 | 15 | 3.15 | 4.8 |
| 3 | 315 | 15 | 3.25 | 4.6 |
| 4 | 315 | 15 | 3.30 | 4.5 |
| 5 | 320 | 15 | 3.30 | 4.5 |
| 6 | 320 | 15 | 3.30 | 4.5 |
| 7 | 330 | 15 | 3.30 | 4.5 |
| 8 | 330 | 15 | 4.35 | 3.4 |
| 9 | 340 | 15 | 5.00 | 3.0 |
| 10 | 340 | 15 | 5.50 | 2.7 |
| 11 | 340 | 15 | 5.40 | 2.8 |
| 12 | 340 | 15 | 5.75 | 2.6 |

A relatively higher density material was generated by running the above formulation at higher conveyor speeds (i.e., with a reduced dwell time).

To prepare a relatively soft material, for example, with a softness on the order of between about 0.5 and 2.0 psi CD, the formulation set forth in Table 3 was used.

TABLE 3

Formulation

| Component | Type/Compound(s) | Trade name/Source | Amount |
|---|---|---|---|
| Ester Resin | Polyglycol Adipate | Lexorez 1931-50 (available from Inolex Chemical Company) | 100 phr |
| Blowing Agent | Azodicarbonamide | Ritchem AC1000 (available from Rit-Chem Co, Inc) | 5 phr |
| Wetting and Dispersing Agent | Tripropyleneglycol monomethylether/ Dipropyleneglycol monomethyl ether | BYI 185 (available from BYK Chemie) | 1 phr |
| MDI Prepolymer | Modified 4,4'-diphenylmethane-diisocyanate | Suprasec 2543 (available from Huntsman) | 25.7 phr |
| Tertiary amine catalyst | 33% triethylenediamine in dipropylene glycol | Dabco 33LV (available from Air Products) | 0.10% |
| Dye | Nonionic polymeric colorant blend | Milliken Black 454SS or Black X-77 (available from Milliken Chemicals, Spartanburg, SC) | 0.15 |

All patents and patent applications cited in the foregoing text are expressly incorporate herein by reference in their entirety. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The invention claimed is:

1. A process for preparing a polyurethane or polyurethane/urea elastomeric closed cell foam, comprising the steps of:
    a) blending components including at least one polyisocyanate with at least one polyol, and at least one blowing agent;
    b) curing the blended components to form a solid polymeric elastomer, wherein the at least one blowing agent is dispersed in the elastomer; and c) heating the solid polymeric elastomer to activate the at least one blowing agent and form a solid polyurethane or polyrethane/urea elastomeric closed cell foam wherein the step c) is carried out in an oven with at least two zones set at two different temperatures and wherein the solid polymeric elastomer is passed through each zone at a speed to provide a dwell time at the particular temperature.

2. The process of claim 1, wherein a $C_{2-10}$ diol chain extender is blended with the polyisocyanate, polyol, and blowing agent.

3. The process of claim 2, wherein the $C_{2-10}$ diol is butanediol.

4. The process of claim 1, wherein at least one amine catalyst is blended before curing.

5. The process of claim 1, wherein the at least one blowing agent is azodicarbonamide.

6. The process of claim 1, wherein the step of heating the polymeric elastomer comprises heating to a first and second temperature.

7. The process of claim 6, wherein the first temperature is a temperature below an activating temperature for the chemical blowing agent.

8. The process of claim 6, wherein the second temperature is a temperature sufficient to activate any blowing agent present.

9. The process of claim 1, wherein the closed cell foam has greater than 10 ppi (pores per inch).

10. The process of claim 1, wherein the closed cell foam exhibits a water absorption of not greater than 15% according to ASTM D1056 and not greater than 0.5% by weight of chlorine based on the total weight of the polymer composition.

11. The process of claim 1, wherein the closed cell foam exhibits a compression deflection at 25% of from 1 psi to 13 psi according to ASTM D1056.

12. The process of claim 1, wherein the closed cell foam exhibits a density of from 3 lb/ft$^3$ to 30 lb/ft$^3$ according to ASTM D1056.

13. The process of claim 1, wherein the closed cell foam exhibits a tensile strength of at least 60 psi according to ASTM D412.

14. The process of claim 1, wherein the closed cell foam exhibits an elongation of greater than 150% according to ASTM D412.

15. The process of claim 1, wherein the closed cell foam exhibits a maximum compression and elevated temperature maximum compression set of less than 20% according to ASTM D1056.

16. The process of claim 1, wherein the closed cell foam exhibits a fluid resistance of not greater than 75% according to ASTM D1056.

* * * * *